Dec. 14, 1937.  S. SHAFER, JR  2,102,575
SCUMMER FOR SETTLING TANKS AND THE LIKE
Filed Aug. 7, 1935  3 Sheets-Sheet 1
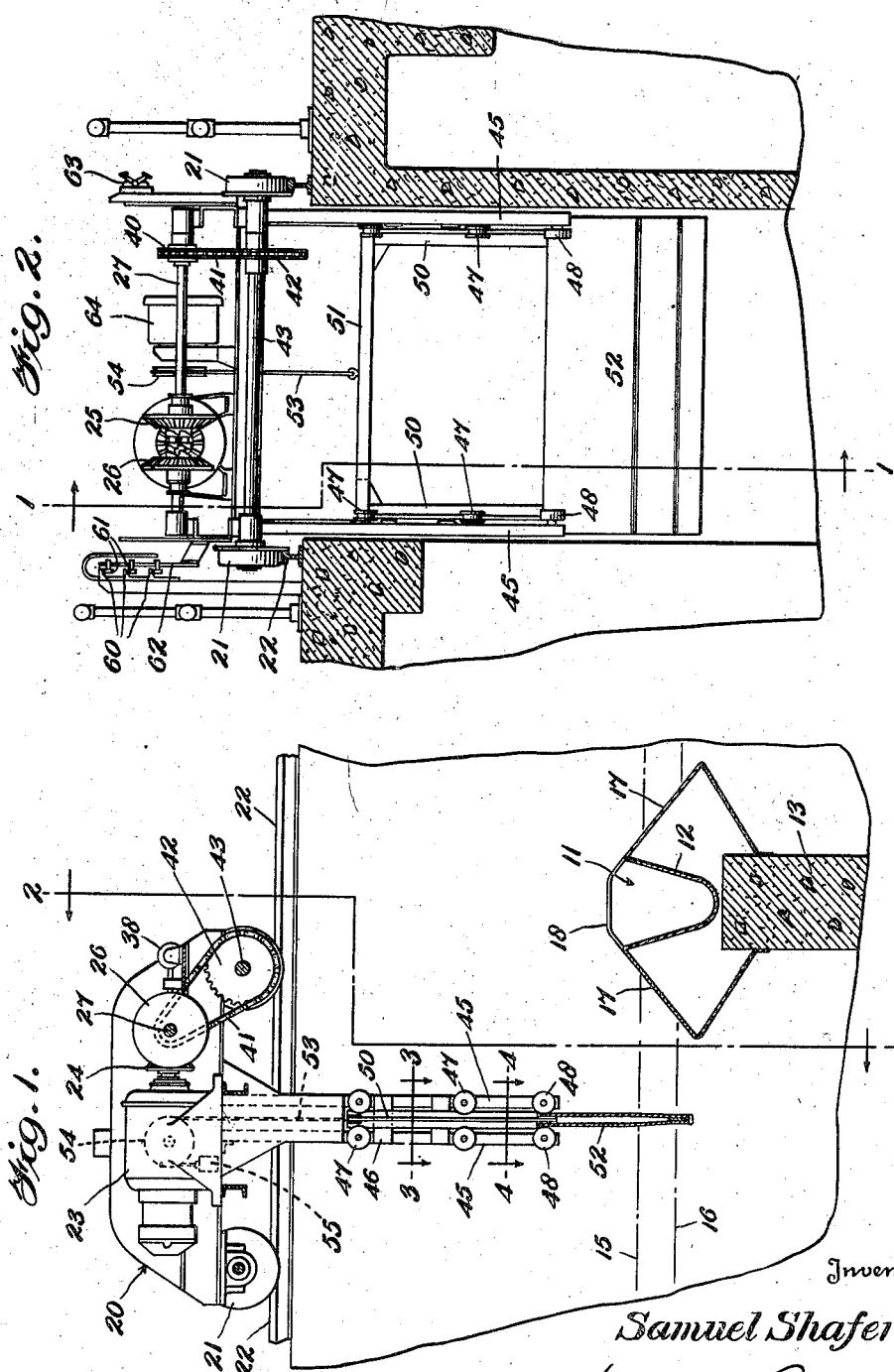
Inventor
Samuel Shafer, Jr.
By Barker & Collings
Attorneys

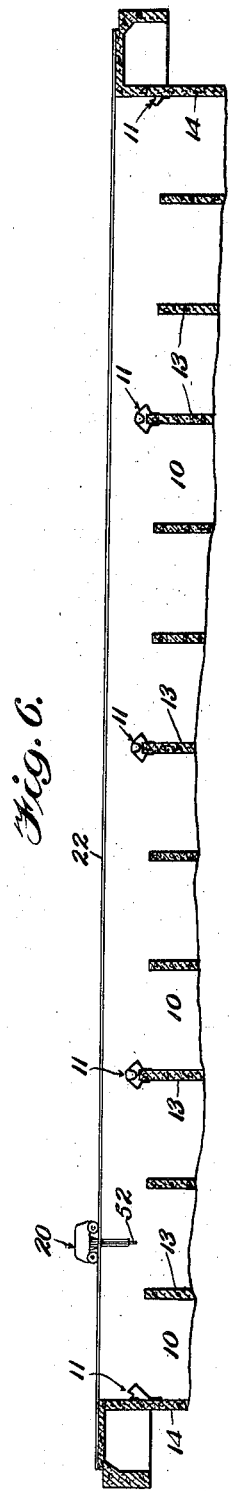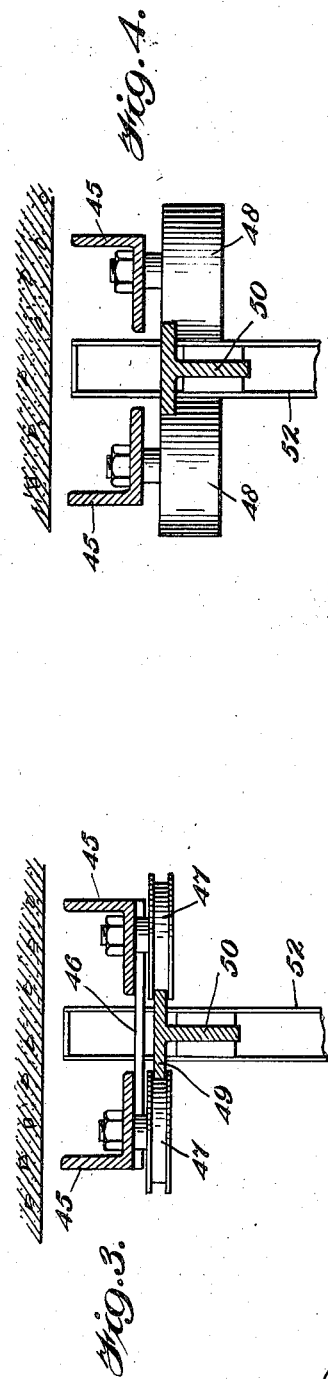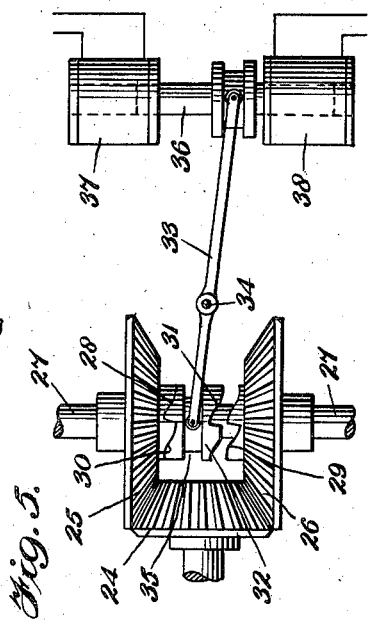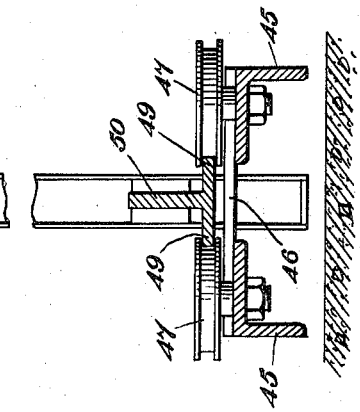

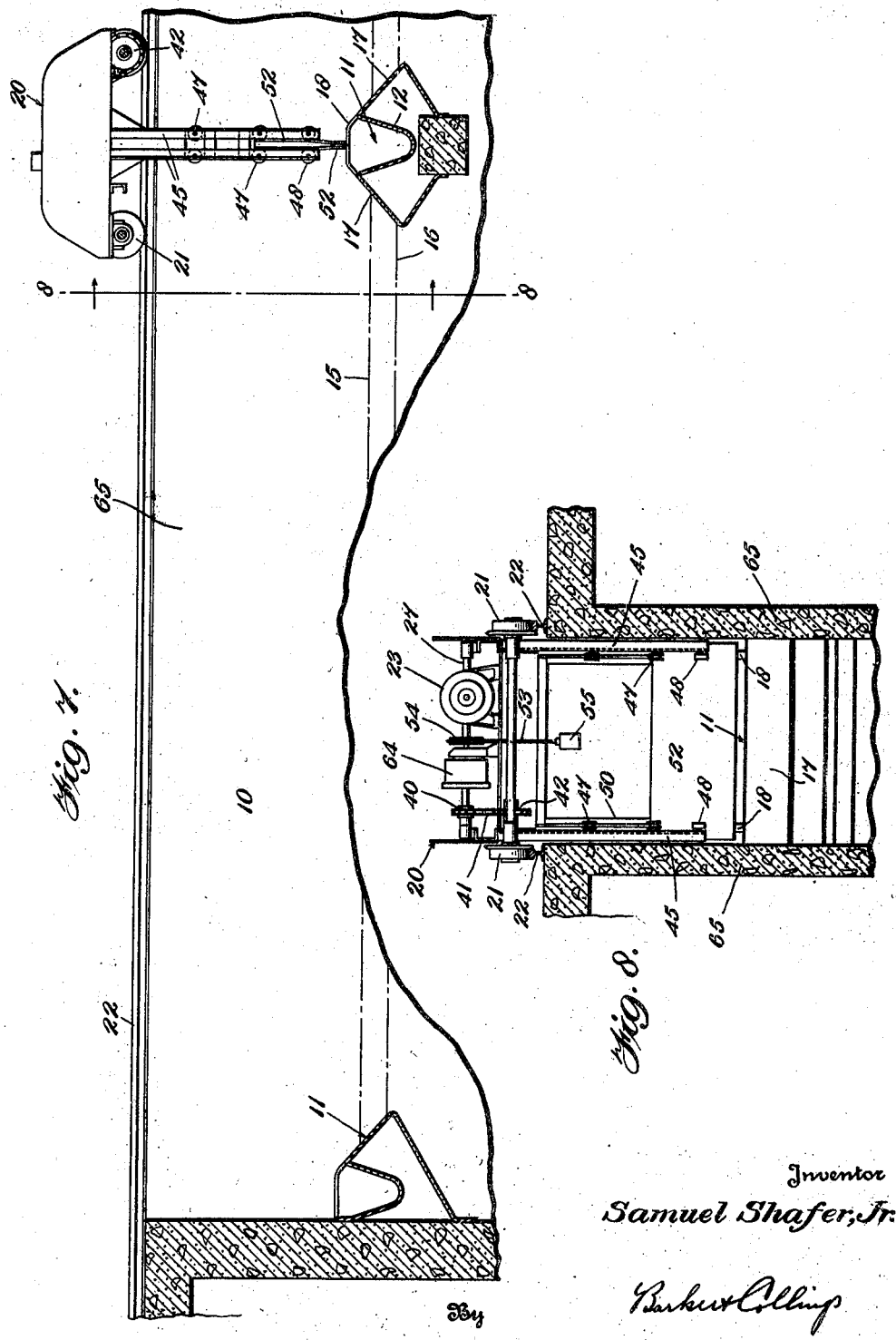

Patented Dec. 14, 1937

2,102,575

UNITED STATES PATENT OFFICE 2,102,575

SCUMMER FOR SETTLING TANKS AND THE LIKE

Samuel Shafer, Jr., Milwaukee, Wis., assignor to Chain Belt Company, Milwaukee, Wis., a corporation of Wisconsin Application August 7, 1935, Serial No. 35,187

3 Claims. (Cl. 210—3)

This invention relates to scummers for settling tanks and the like, and has for one of its objects to provide apparatus of this character which will be simple in construction, comparatively inexpensive to manufacture and install, and more efficient in use than those which have been heretofore proposed.

In various liquid separation and purification operations, of which the handling of raw sewage may be cited as one typical example, it is customary to provide relatively large tanks or receptacles into which are introduced liquids bearing light and heavy solids. The liquid is maintained in the tanks in a relatively quiescent state, to the end that the heavier solids may settle and form a sludge which is either constantly or intermittently removed from the bottom of the tank by various mechanisms. In many instances, certain of the lighter solids are so light as to float upon the liquid surface and refuse to settle, and in order that the maximum degree of separation or purification may be attained, it is necessary to provide means for skimming such floating debris from the liquid surface.

The present invention relates to this latter class of apparatus, and in its preferred embodiment comprises a carriage, preferably motor driven, mounted for movement to and fro above the surface of the liquid in the tank, which carriage is provided with a scum blade extending downwardly to slightly below the liquid surface, and mounted for vertical movements relative to the carriage. One or more scum-receiving troughs or receptacles are provided in the path of travel of the said blade, such troughs having portions both above and below the liquid level; and the relation of the parts is such that as the blade reaches the trough, its lower edge engages and rides up an inclined wing thereof, pushing the scum and/or floating debris into the trough. The troughs may be provided with spaced bridge members for supporting the blade and preventing it from dropping into the trough, although permitting it to deposit the scum therein.

The invention is susceptible of use in a single tank, or in connection with a battery of tanks, and for purposes of disclosure has been here illustrated in both forms.

With the above and other objects in view which will appear as the description proceeds, the invention consists in the novel details of construction and combinations of parts more fully hereinafter described and particularly pointed out in the appended claims.

Referring more particularly to the accompanying drawings forming part of this specification, in which like reference characters designate like parts in all the views:—

Figure 1 is a longitudinal sectional elevational view of a preferred embodiment of the scumming apparatus, taken approximately on the plane indicated by the line 1—1 of Fig. 2, looking in the direction of the arrows;

Fig. 2 is a transverse sectional elevational view, approximately on the plane indicated by the line 2—2 of Fig. 1, looking in the direction of the arrows;

Fig. 3 is an enlarged horizontal sectional view, approximately on the plane indicated by the line 3—3 of Fig. 1, looking down;

Fig. 4 is a fragmentary view similar to Fig. 3, but taken approximately on the plane indicated by the line 4—4 of Fig. 1;

Fig. 5 is a fragmentary plan view, illustrating the mechanism for reversing the carriage travel;

Fig. 6 is a diagrammatic fragmentary transverse sectional view, illustrating the use of the scummer with a battery of settling tanks;

Fig. 7 is a fragmentary longitudinal sectional view of the upper part of a single settling tank equipped with the scumming apparatus of this invention; and Fig. 8 is a transverse sectional view taken on the plane indicated by the line 8—8 of Fig. 7, looking in the direction of the arrows.

Referring first more particularly to Fig. 6, there is illustrated a separation or purification installation comprising a battery of sedimentation tanks 10 disposed side by side. Each of these tanks may be provided with sludge removing apparatus of any suitable character, such for example, as the endless belt and scraper type shown in the prior U. S. Patent No. 1,990,458, granted February 5, 1935, to William B. Marshall. This type of apparatus—which in itself constitutes no part of the present invention, and therefore has not been illustrated—not only scrapes the settled heavy-solid sludge to one end of the tank bottoms where it may be drawn off, but the upper run of the conveyor is so arranged at the liquid level that the scraper flights move the scum and floating debris to the other end of the tanks, where it may be transferred by appropriate mechanism to scum receptacles.

When used with an installation of this character, the present invention is preferably arranged to move transversely of all of the tanks of the battery, and to collect the scum which has been moved by the several sludge conveyors to this end—which is ordinarily the effluent end—of the tanks, and to transfer it into the scum receptacles 11. As best shown in Figs. 1 and 6 these receptacles may take the form of sheet metal troughs 12 mounted at the top of certain of the dividing walls 13 between adjacent tanks and/or upon the extreme side walls 14. The said scum troughs are preferably positioned at substantially the liquid level, which may vary somewhat, within the limits indicated by the broken lines 15 and 16 in Fig. 1; and they are provided with the lateral inclined wings 17, extending from below to above the said liquid level, and up and down which the scummer blade to be hereafter described may slide. The troughs are also preferably provided with the narrow spaced straps or bridge members 18 spanning them from side to side, which not only brace the troughs themselves, but also support the scum blade as it travels across the troughs and prevent it from dropping thereinto.

The scumming apparatus constituting the gist of the present invention as best shown in Figs. 1 and 2, comprises a carriage 20 provided with suitable supporting and traction wheels 21 running upon rails 22 mounted upon the upper surface of the concrete tank walls, the said rails as above intimated being arranged to provide for travel of the carriage transversely of the several tanks 10 at one end thereof. The carriage is provided with a suitable motor 23 here shown as an electric motor, which drives a bevel gear 24 which meshes with two companion gears 25 and 26 disposed at opposite sides of the gear 24 so as to be driven in opposite directions thereby. The said gears 25 and 26 are loosely mounted upon a countershaft 27 and they are respectively provided with clutch members 28 and 29 which are adapted to be alternately engaged by the companion clutch members 30 and 31 of a collar 32 which is splined to the shaft 27. A shifting lever 33 is pivoted as at 34 to the carriage framework and one end thereof engages a groove 35 provided on the collar 32 while the other end of the said lever is arranged to be moved back and forth by a rod or plunger 36 which constitutes the armature for a pair of solenoids 37 and 38. These solenoids are adapted to be alternately energized in any suitable manner by either manual or automatic control, and as will be readily understood, when one of them, as for example the solenoid 38, is energized the clutch shifting lever 33 will be moved to the position shown in Figure 5, wherein the clutch members 28 and 30 are engaged while the clutch members 29 and 31 are disengaged so that the power from the motor 23 will be transmitted through gears 24 and 25 and collar 32 to the shaft 27 to rotate the latter in a predetermined direction. On the other hand when the solenoid 37 is energized and the solenoid 38 is deenergized, the clutch will be shifted to provide a drive through gears 24 and 26 whereby the direction of rotation of shaft 27 will be reversed.

Said shaft 27 is provided with a sprocket 40 around which passes the sprocket chain 41 which also engages the sprocket 42 carried by the shaft or axle 43 upon which one pair of the supporting wheels 21 is mounted whereby traction may be supplied for the carriage and the latter caused to move upon the rails 22. Depending from either side of the carriage frame is a pair of spaced vertical angle members 45 which are maintained in spaced relation by suitable braces 46, see Fig. 1, and which angle members carry suitable guiding rolls 47 and 48. As will be clear from Figure 3, the rolls 47 are preferably of the grooved type, the grooves thereof being engaged by the head flanges 49 of vertically disposed T-members 50. The said T-members are connected together at their upper ends by a transverse member 51 to maintain them in spaced relation, and at their lower ends are secured to the scummer blade 52 which extends between them as will be clear from Figs. 1 and 2. This blade may be of any suitable construction, but it is preferred to make it of sheet aluminum in substantially the form shown in said Figs. 1 and 2.

The transverse frame member 51 has secured to it a cable or chain 53 which passes upwardly over a pulley 54 suitably journalled upon the carriage frame, and the other end of the said chain or cable 53 has attached to it a suitable counterweight 55, see Fig. 1, which partially but not completely counter balances the weight of the blade 52 and its frame members 50 and 51. The blade is thus free to move vertically under the influence of gravity with its frame members 50 being guided by the grooved rolls 47 and with the plain rolls 48 bearing upon the flat surface of the blade as will be readily understood from Figs. 1 and 2.

Electric current for the operation of the motor 23 may be supplied by suitable conductors 60 supported at one side of the trackway and may be transferred to the carriage 20 by suitable sliding contacts 61 carried by a trolley arm 62. The carriage may be provided with a suitable push button mechanism 63 and with a magnetic starting mechanism 64 for controlling the motor 23, all of which mechanism may be of any usual and well-known construction and in itself constitutes no part of the present invention.

The operation of the scummer will be readily apparent from the foregoing, it being understood that upon current being supplied to the motor 23 it will drive the carriage along the rails 22 in one direction or the other depending upon which pair of the clutch members 28, 29, 30, 31 are engaged. The scummer blade 52 will normally occupy a position such as shown in Figs. 1 and 2, with its lower edge somewhat below the surface of the liquid within the tanks and as it is moved along by the carriage it will, of course, transfer the scum and debris floating upon the surface of the liquid in advance of it. As it reaches one of the scum receptacles 11, the lower edge of the blade will ride up on to the inclined wing 17 and the scum and debris will be disposed in the scum trough 12 from which it may flow into any suitable receptacle or be otherwise disposed of in the usual manner. Continued movement of the carriage and blade will cause the latter to ride across the strap or bridge members 18 and down the opposite inclined wing 17 to bring its lower edge again below the liquid surface. When the carriage reaches the extreme side of the battery of tanks the appropriate solenoid 37 or 38 will be energized, usually automatically, to reverse the carriage motion and the scumming operation will be repeated during the return travel of the carriage.

While the invention has been thus illustrated in Figs. 1 to 6 inclusive and described as applied to a battery of tanks, it will be obvious that the scummer may be also applied to a single tank, in which event it would be mounted to travel longitudinally of the latter and to take the place the scumming action of the sludge remover, as shown in Figs. 7 and 8, wherein the frame members 45 depend from the carriage 20 immediately adjacent the side walls 65 of the tank and carry the rolls 47 and 48 guiding the scummer blade 52 which extends substantially from wall to wall. It is therefore obvious that various changes may be made in the details of construction and precise arrangement of the parts without departing from the spirit of the invention and it is not wished to be limited to the above disclosure except as may be required by the claims.

What I claim is:

1. In sedimentation apparatus and the like, a plurality of tanks arranged side by side; scum receiving troughs carried by the division walls of said tanks; and a reciprocating scumming device arranged to transversely traverse all of said tanks, and to successively pass over and deposit scum in said troughs.

2. In apparatus for removing accumulating scum from a plurality of settling tanks, a common division wall separating adjacent tanks; a scum trough supported above the level of liquid in the tanks by said division wall and arranged to receive scum from either tank adjacent thereto; and a single scum collecting instrumentality arranged to successively collect accumulating scum from the surface of the liquid in said tanks and to pass the scum alternately from each adjacent tank to said scum trough.

3. In scum removing apparatus for settling tanks and the like which are provided with scum receiving receptacles, a mobile carriage arranged for horizontal travel above the surface of the liquid in the tank; frame members depending perpendicularly from said carriage adjacent either side wall of said tank; pairs of spaced guide rolls disposed vertically on each frame member; and a scum blade extending transversely of said tank substantially from wall to wall thereof, said blade being provided with vertical guide members disposed between said pairs of rolls, whereby it may reciprocate rectilinearly as it passes over the scum receiving receptacles.

SAMUEL SHAFER, Jr.